US011808014B2

(12) United States Patent
Rhodes et al.

(10) Patent No.: US 11,808,014 B2
(45) Date of Patent: Nov. 7, 2023

(54) WORK MACHINES INCORPORATING ENCODER SYSTEMS, DRIVE ASSEMBLIES THEREFOR, AND METHODS OF MEASURING TORQUE USING ENCODER SYSTEMS

(71) Applicant: DEERE & COMPANY, Moline, IL (US)

(72) Inventors: Michael L. Rhodes, Richfield, MN (US); Robert J. White, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 430 days.

(21) Appl. No.: 17/068,240

(22) Filed: Oct. 12, 2020

(65) Prior Publication Data

US 2022/0112695 A1    Apr. 14, 2022

(51) Int. Cl.
| | | |
|---|---|---|
| *E02F 9/26* | (2006.01) | |
| *A01B 79/00* | (2006.01) | |
| *E02F 9/08* | (2006.01) | |
| *E02F 9/10* | (2006.01) | |

(52) U.S. Cl.
CPC ............ *E02F 9/264* (2013.01); *A01B 79/005* (2013.01); *E02F 9/0808* (2013.01); *E02F 9/10* (2013.01)

(58) Field of Classification Search
CPC ........... E02F 9/264; E02F 9/0808; E02F 9/10; A01B 79/005; B60K 5/00; B60K 1/00; B60K 2001/001; G01L 3/105
USPC ........................................................ 701/50
See application file for complete search history.

(56) References Cited

U.S. PATENT DOCUMENTS

| | | |
|---|---|---|
| 6,935,195 B2 | 8/2005 | Tokumoto et al. |
| 7,093,504 B2 | 8/2006 | Southward |
| 8,001,848 B2 | 8/2011 | White et al. |
| 10,267,691 B2 | 4/2019 | Leonard et al. |
| | (Continued) | |

FOREIGN PATENT DOCUMENTS

| | | |
|---|---|---|
| DE | 19745823 A1 | 4/1999 |
| DE | 102017207242 A1 | 1/2018 |
| EP | 0266477 A1 | 5/1988 |

OTHER PUBLICATIONS

German Search Report issued in application No. DE102021209576.3, dated Aug. 1, 2022, 8 pages.

*Primary Examiner* — Mahmoud S Ismail
(74) *Attorney, Agent, or Firm* — Taft Stettinius & Hollister LLP; Stephen F. Rost

(57) ABSTRACT

Work machines, drive assemblies for work machines, and methods of measuring torque of a driven component of a work machine are disclosed herein. A work machine includes a frame structure, a rotational power source supported by the frame structure, and a driven component supported by the frame structure that is coupled to the rotational power source to receive rotational power therefrom in use of the work machine. The driven component extends between a first end and a second end arranged opposite the first end. Additionally, the work machine includes a first encoder system coupled to the first end of the driven component, a second encoder system coupled to the second end of the driven component, and a control system supported by the frame structure that includes a controller communicatively coupled to the first encoder system and the second encoder system.

20 Claims, 6 Drawing Sheets

(56) References Cited

U.S. PATENT DOCUMENTS

| | | |
|---|---|---|
| 2009/0266178 A1 | 10/2009 | Matzoll, Jr. et al. |
| 2012/0273294 A1* | 11/2012 | Yoshida .................. B62D 6/10 29/840 |
| 2018/0003578 A1* | 1/2018 | Leonard .............. B60R 16/0232 |
| 2018/0154926 A1* | 6/2018 | Ohira .................... B62D 15/02 |
| 2019/0376858 A1 | 12/2019 | Hammerschmidt et al. |

* cited by examiner

US 11,808,014 B2

WORK MACHINES INCORPORATING ENCODER SYSTEMS, DRIVE ASSEMBLIES THEREFOR, AND METHODS OF MEASURING TORQUE USING ENCODER SYSTEMS

FIELD OF THE DISCLOSURE

The present disclosure relates, generally, to work machines including components capable of rotation, and, more specifically, to work machines having encoder systems to measure characteristics of components capable of rotation.

BACKGROUND

Some work machines may include one or more encoder systems that employ toothed wheels to measure characteristics of components capable of rotation. Such encoder systems may be associated with a number of drawbacks. In one example, the encoder systems may be incapable of, or poorly suited to, torque measurement of stationary components. In another example, the amplitude of measurement signals of the encoder systems may be reduced as the number of teeth provided on the wheels increase. In yet another example, the frequency responses of the encoder systems may be limited to an undesirable degree. Accordingly, devices and/or systems to improve measurement of stationary components and/or components driven for rotation via encoder systems remain an area of interest.

SUMMARY

The present disclosure may comprise one or more of the following features and combinations thereof.

According to one aspect of the present disclosure, a work machine may include a frame structure, a rotational power source supported by the frame structure, a driven component supported by the frame structure, a first encoder system, a second encoder system, and a control system supported by the frame structure. The driven component may be coupled to the rotational power source to receive rotational power therefrom in use of the work machine, and the driven component may extend between a first end and a second end arranged opposite the first end. The first encoder system may be coupled to the first end of the driven component. The first encoder system may include a first disk mounted to the driven component for rotation therewith and a first pair of sensors mounted in close proximity to the first disk that are spaced from one another. Each of the first pair of sensors may be configured to provide a first input signal indicative of a distance between the sensor and an outer edge of the first disk or an outer face of the first disk in use of the work machine. The second encoder system may be coupled to the second end of the driven component. The second encoder system may include a second disk mounted to the driven component for rotation therewith and a second pair of sensors mounted in close proximity to the second disk that are spaced from one another. Each of the second pair of sensors may be configured to provide a second input signal indicative of a distance between the sensor and an outer edge of the second disk or an outer face of the second disk in use of the work machine. The control system may include a controller communicatively coupled to the first encoder system and the second encoder system. The controller may include memory having instructions stored therein that are executable by a processor in use of the work machine to cause the processor to receive the first input signals from the first pair of sensors and the second input signals from the second pair of sensors and to calculate a torque of the driven component based at least partially on the first input signals and the second input signals.

In some embodiments, each of the first and second disks may be an eccentric circular disk having a disk center that is offset from a center of the driven component. The first pair of sensors may be mounted in close proximity to the first disk such that the first pair of sensors are circumferentially spaced 90 degrees from one another about the disk center of the first disk, and the second pair of sensors may be mounted in close proximity to the second disk such that the second pair of sensors are circumferentially spaced 90 degrees from one another about the disk center of the second disk.

In some embodiments, each of the first and second disks may be a lobed disk having at least one lobe. Each of the first and second disks may be an elliptical disk having a pair of lobes. Additionally, in some embodiments, each of the first and second disks may have three lobes. Additionally, in some embodiments still, each of the first and second disks may be offset from a center of the driven component.

In some embodiments, each of the first pair of sensors may be configured to provide the first input signal indicative of the distance between the sensor and the outer edge of the first disk in use of the work machine, and each of the second pair of sensors may be configured to provide the second input signal indicative of the distance between the sensor and the outer edge of the second disk in use of the work machine. Additionally, in some embodiments, each of the first pair of sensors may be configured to provide the first input signal indicative of the distance between the sensor and the outer face of the first disk in use of the work machine, and each of the second pair of sensors may be configured to provide the second input signal indicative of the distance between the sensor and the outer face of the second disk in use of the work machine.

In some embodiments, the instructions stored in the memory may be executable by the processor to cause the processor to determine minimum and maximum distances between the first pair of sensors and the outer edge of the first disk based on the first input signals, to determine minimum and maximum distances between the second pair of sensors and the outer edge of the second disk based on the second input signals, to calculate an orientation angle of the first disk based on the first input signals and the determined minimum and maximum distances between the first pair of sensors and the outer edge of the first disk, and to calculate an orientation angle of the second disk based on the second input signals and the determined minimum and maximum distances between the second pair of sensors and the outer edge of the second disk. The instructions stored in the memory may be executable by the processor to cause the processor to determine a stiffness of the driven component, to determine a difference between the calculated orientation angles of the first disk and the second disk at a reference load, and to calculate the torque of the driven component based on the determined stiffness, the calculated orientation angle of the first disk, the calculated orientation angle of the second disk, and the determined difference between the calculated orientation angles of the first disk and the second disk at the reference load.

According to another aspect of the present disclosure, a drive assembly for a work machine may include a driven component to receive rotational power from a rotational power source in use of the drive assembly, a first encoder system, a second encoder system, and a control system. The driven component may extend between a first end and a second end arranged opposite the first end. The first encoder system may be coupled to the first end of the driven component for rotation therewith, and the first encoder system may include a first disk mounted to the driven component and a first pair of sensors mounted in close proximity to the first disk that are spaced from one another. Each of the first pair of sensors may be configured to provide a first input signal indicative of a distance between the sensor and an outer edge of the first disk in use of the drive assembly. The second encoder system may be coupled to the second end of the driven component for rotation therewith, and the second encoder system may include a second disk mounted to the driven component and a second pair of sensors mounted in close proximity to the second disk that are spaced from one another. Each of the second pair of sensors may be configured to provide a second input signal indicative of a distance between the sensor and an outer edge of the second disk in use of the drive assembly. The control system may include a controller communicatively coupled to the first encoder system and the second encoder system. The controller may include memory having instructions stored therein that are executable by a processor in use of the work machine to cause the processor to receive the first input signals from the first pair of sensors and the second input signals from the second pair of sensors and to calculate a torque of the driven component based at least partially on the first input signals and the second input signals.

In some embodiments, each of the first and second disks may be an eccentric circular disk having a disk center that is offset from a center of the driven component. The first pair of sensors may be mounted in close proximity to the first disk such that the first pair of sensors are circumferentially spaced 90 degrees from one another about the disk center of the first disk, and the second pair of sensors may be mounted in close proximity to the second disk such that the second pair of sensors are circumferentially spaced 90 degrees from one another about the disk center of the second disk.

In some embodiments, each of the first and second disks may be a lobed disk having at least one lobe. Each of the first and second disks may be an elliptical disk having a pair of lobes.

According to yet another aspect of the present disclosure, a method of measuring torque of a driven component of a work machine may include (i) receiving, by a controller of the work machine, a first input signal from each one of a first pair of sensors of a first encoder system coupled to a first end of the driven component, wherein the first input signal is indicative of a distance between the sensor and an outer edge of a first disk of the first encoder system, (ii) receiving, by the controller, a second input signal from each one of a second pair of sensors of an encoder system coupled to a second end of the driven component that is arranged opposite the first end, wherein the second input signal is indicative of a distance between the sensor and an outer edge of a second disk of the second encoder system, and (iii) calculating, by the controller, the torque of the driven component based at least partially on the first input signals from the first pair of sensors and the second input signals from the second pair of sensors.

In some embodiments, the method may include determining, by controller, minimum and maximum distances between the first pair of sensors and the outer edge of the first disk based on the first input signals, and determining, by the controller, minimum and maximum distances between the second pair of sensors and the outer edge of the second disk based on the second input signals. The method may include calculating, by the controller, an orientation angle of the first disk based on the first input signals and the determined minimum and maximum distances between the first pair of sensors and the outer edge of the first disk; and calculating, by the controller, an orientation angle of the second disk based on the second input signals and the determined minimum and maximum distances between the second pair of sensors and the outer edge of the second disk. The method may include determining, by the controller, a stiffness of the driven component, determining, by the controller, a difference between the calculated orientation angles of the first disk and the second disk at a reference load, and calculating, by the controller, the torque of the driven component based on the determined stiffness, the calculated orientation angle of the first disk, the calculated orientation angle of the second disk, and the determined difference between the calculated orientation angles of the first disk and the second disk at the reference load.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example; the dimensions of some elements may be exaggerated relative to other elements for clarity. Further, where considered appropriate, reference labels have been repeated among the figures to indicate corresponding or analogous elements.

DETAILED DESCRIPTION

Figure 1:
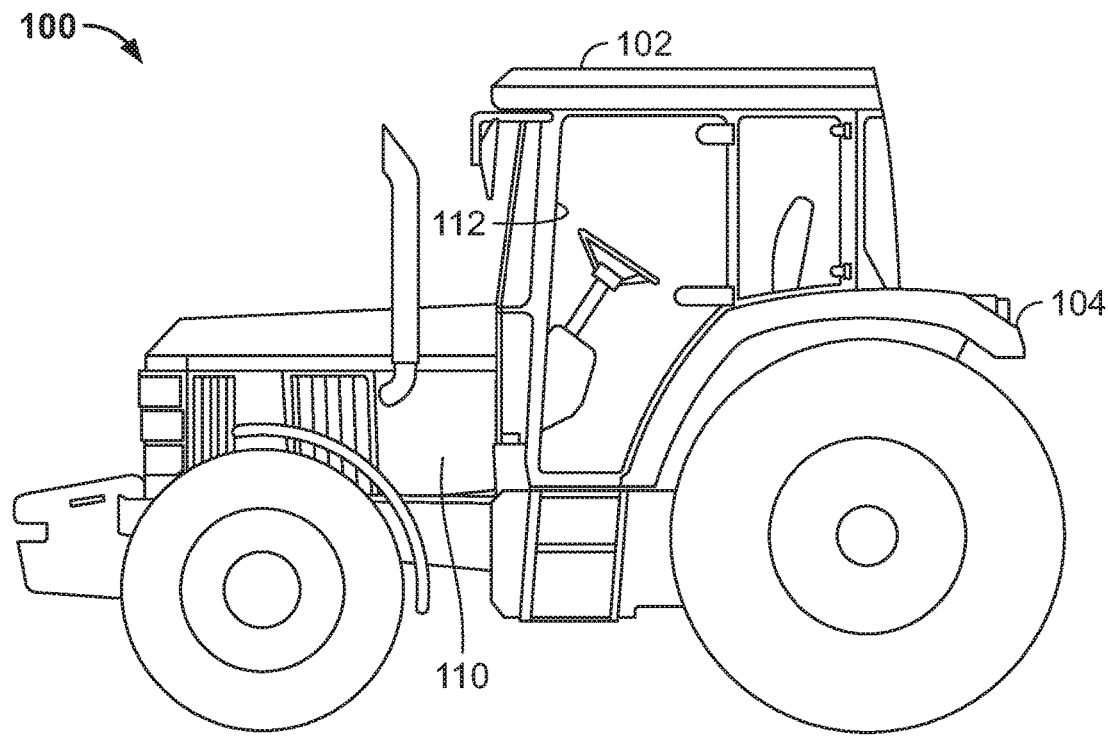
FIG. 1 is a side elevation view of a work machine having a number of components driven for rotation in use thereof.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature; structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an illustrative work machine or agricultural vehicle 100 is embodied as, or otherwise includes, a tractor 102 that is configured to tow, pull, or otherwise drive movement of, one or more work implements (not shown) which may be attached thereto. In some embodiments, the tractor 102 may include an implement attachment interface (not shown) to attach the one or more work implements at a rear end 104 of the tractor 102. It should be appreciated that in some embodiments, the implement attachment interface may be embodied as, or otherwise include, a hitch, a drawbar, or the like.

In some embodiments, the illustrative tractor 102 may be embodied as, or otherwise include, any one of a number of tractors manufactured by John Deere. For example, the tractor 102 may be embodied as, or otherwise include, any one of the following: a series 9570R Tractor, a series 9620R Tractor, a series 9470RT Tractor, a series 9520RT Tractor, a series 9570RT Tractor, a series 9420RX Tractor, a series 9470RX Tractor, a series 9520RX Tractor, a series 9570RX Tractor, or a series 9620RX Tractor. Of course, in other embodiments, it should be appreciated that the tractor 102 may be embodied as, or otherwise include, any other suitable tractor or agricultural vehicle.

In some embodiments still, the torque measurement systems contemplated by the present disclosure may be utilized in other applications. Such applications may include, but are not limited to, stationary equipment, systems, or devices, off-road vehicles and/or equipment, over-the-road vehicles and/or equipment, aerospace vehicles and/or equipment, rail vehicles and/or equipment, and ships and/or shipping equipment, as the case may be.

Furthermore, it should be appreciated that the tractor 102 may be embodied as, or otherwise include, equipment used in one or more of a variety of applications. In the illustrative embodiment, the tractor 102 is adapted for use in one or more agricultural applications. In other embodiments, however, the tractor 102 may be embodied as, included in, or otherwise adapted for use with, equipment used in lawn and garden, construction, landscaping and ground care, golf and sports turf, forestry, engine and drivetrain, or government and military applications, for example.

Additionally, in some embodiments, the work machine 100 of the present disclosure may be embodied as, included in, or otherwise adapted for use with, front end loaders, scraper systems, cutters and shredders, hay and forage equipment, planting equipment; seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, benchers, forwarders, harvesters, swing machines, knuckleboom loaders, diesel engines, axles, planetary gear drives, pump drives, transmissions, generators, or marine engines, among other suitable equipment. Of course, in such embodiments, it should be appreciated that the work machine 100 may be adapted for use in a variety of applications, such as those described above with respect to the tractor 102.

In the illustrative embodiment, the work machine 100 includes a frame structure 110, a rotational power source 220 (see FIG. 2) supported by the frame structure 110, and at least one driven component 230 supported by the frame structure 110. The frame structure 110 may include; or otherwise be embodied as, a main frame or main chassis of the work machine 100, and the frame structure 110 may define and/or support an operator cab 112 in which various operational controls for the work machine 100 are provided. The rotational power source 220 may be embodied as, or otherwise include, a drive unit or engine that is configured to supply driving rotational power to one or more driven components of the work machine 100, such as the driven component 230. The driven component 230 is coupled to the rotational power source 220 to receive rotational power therefrom in use of the work machine 100, and the driven component extends 230 between a first end 232 and a second end 234 arranged opposite the first end 232.

In addition, the illustrative work machine 100 includes a first encoder system 240 coupled to the driven component 230, a second encoder system 260 coupled to the driven component 230, and a control system 700 (see FIG. 7) supported by the frame structure 110. The first and second encoder systems 240, 260 are coupled to respective ends 232, 234 of the driven component 230. The encoder systems 240, 260 are substantially identical, and for the sake of simplicity, detailed discussion of the encoder system 260 below is generally omitted. In one example, the encoder system 240 includes a disk 342 (see FIG. 3) mounted to the driven component 230 for rotation therewith and a pair of sensors 346, 348 mounted in close proximity to the disk 342 that are spaced from one another. In the illustrative embodiment, each of the sensors 346, 348 is configured to provide a first input signal indicative of a distance between the sensor and an outer edge 344 of the disk 342 in use of the work machine 100.

In some embodiments, the sensors 346, 348 may be mounted to a stationary structure (not shown) located in close proximity to, or near, the outer edge 344 of the disk 342. For example, in some embodiments, the sensors 346, 348 may be mounted to the frame structure 110 in close proximity to the outer edge 344. Of course, in other embodiments, it should be appreciated that the sensors 346, 348 may be mounted to, or otherwise affixed to, another suitable stationary structure in close proximity to the outer edge 344 of the disk 342. In any case, at least in some embodiments, the sensors 346, 348 may be radially aligned with a centerline of the driven component 230, which may be embodied as, or otherwise include, a shaft. In such embodiments, each of the sensors 346, 348 may be configured to measure the distance from the sensor 346, 348 to the outer edge 344 of the disk 342 as the disk 342 is driven for rotation.

Further, in the illustrative embodiment, the control system 700 includes a controller 702 communicatively coupled to the encoder systems 240, 260. The controller 702 includes memory 704 having instructions stored therein that are executable by a processor 706. More specifically, as described in greater detail below, in use of the work machine 100, the instructions stored in the memory 704 are executable by the processor 706 to cause the processor 706 to receive the input signals from the sensors (e.g., sensors 346, 348) of the encoder systems encoder systems 240, 260) coupled to the driven component 230 and to calculate a torque of the driven component 230 based at least partially on those input signals.

The encoder systems (e.g., 240, 260) contemplated by the present disclosure may, provide, or otherwise be associated with, a number of benefits and/or advantages compared to other configurations, such as configurations that employ one or more toothed wheels, for example. In one respect, the encoder systems disclosed herein may be uniquely suited to measure torque of a driven component (e.g., the component 230) even when the component is stationary and/or under a load that is negligible or non-appreciable. In another respect, the encoder systems of the present disclosure may measure torque of a driven component with improved accuracy as the degree of eccentricity of the disks thereof (e.g., the disk 342) increases. In yet another respect, the frequency response of each encoder system disclosed herein may be limited only by the natural frequency of the driven component such that the frequency response is limited to a lesser degree than would otherwise be the case in a different configuration.

Figure 2:
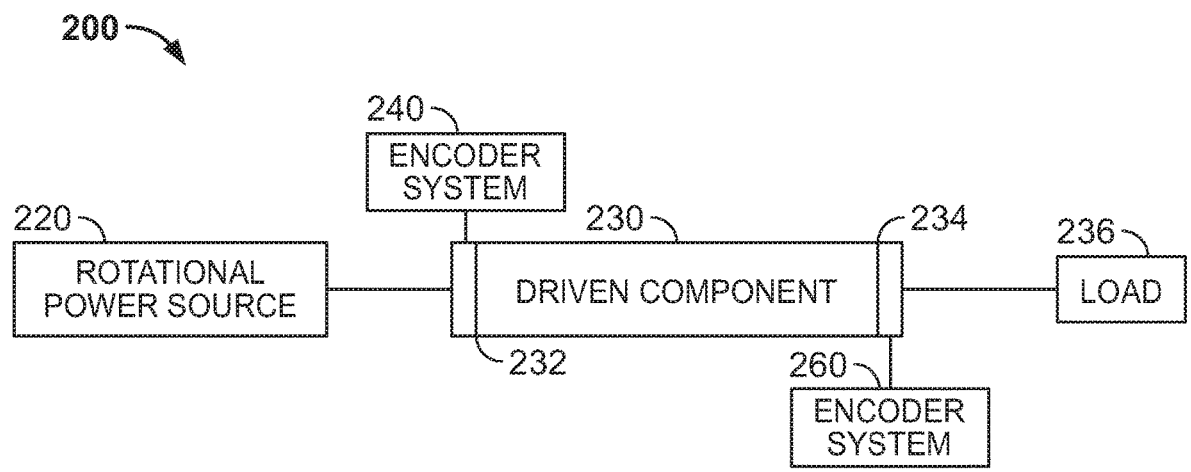
FIG. 2 is a simplified diagrammatic view of a drive assembly of the work machine of FIG. 1 that incorporates two encoder systems to measure torque of a component driven for rotation.

Referring now to FIG. 2, in the illustrative embodiment, a drive assembly 200 included in, or otherwise adapted for use with, the work machine 100 includes the driven component 230, the encoder systems 240, 260 coupled to respective ends 232, 234 of the driven component 230 as indicated above, and the control system 700. In the illustrative arrangement, the end 232 of the driven component 230 is coupled to the rotational power source 220 and the end 234 of the driven component 230 is coupled to a load 236. Of course, it should be appreciated that in other embodiments, the devices of the drive assembly 200 may have another suitable arrangement.

The driven component 230 is illustratively embodied as, or otherwise includes, any, component or collection of components capable of receiving rotational power and/or torque from the rotational power source 220 and transmitting rotational power and/or torque to a load 236 that is coupled to the driven component 230. In some embodiments, the driven component 230 may be embodied as, or otherwise includes, a shaft, rod, elastic member, an axle, or the like that extends along a longitudinal axis and is configured for rotation about the longitudinal axis. Of course, in other embodiments, it should be appreciated that the driven component 230 may be embodied as, or otherwise include, another suitable component, such as a sleeve, a bracket, a hub, a ring, a bearing, a sheave, a pulley, or the like, for example.

Figure 3:
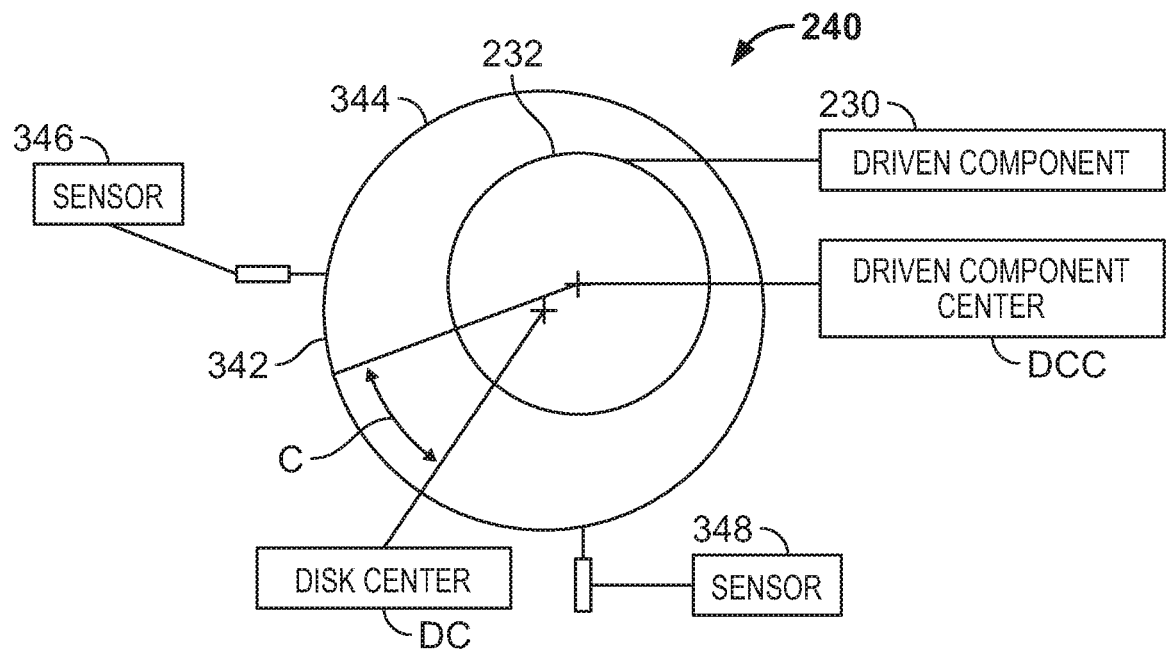
FIG. 3 is an end view of one embodiment of one of the encoder systems of the drive assembly diagrammatically depicted in FIG. 2.

Referring now to FIG. 3, the eccentric disk 342 of the illustrative encoder system 240 is mounted to the driven component 230 for rotation therewith and the sensors 346, 348 are mounted in close proximity to the edge 344 of the disk 342 as indicated above. In the illustrative embodiment, the disk 342 is embodied as, or otherwise includes, an eccentric disk or a lobed disk having a generally circular shape. More specifically, the illustrative disk 342 has a disk center DC that is offset from, and spaced from, a center DCC of the driven component 230. It should be appreciated that in other embodiments, the disk 342 may take the shape of another suitable geometric form.

In the illustrative embodiment, the sensors 346, 348 are mounted in close proximity, to the edge 344 of the disk 342 such that the sensors 346, 348 are spaced from one another in a circumferential direction about the disk center DC that is indicated by arrow C. More specifically, the sensors 346, 348 are mounted in close proximity to the edge 344 such that the sensors 346, 348 are circumferentially spaced 90 degrees from one another about the disk center DC. As such, the sensors 346, 348 may be said to be arranged and/or oriented orthogonally to one another. In some embodiments, the orthogonal arrangement and/or orientation of the sensors 346, 348 relative to one another may simplify computation and measurement of the torque of the driven component 230 according to the method 900 described below. Of course, it should be appreciated that in other embodiments, the sensors 346, 348 may have another suitable arrangement and/or orientation relative to one another.

In the illustrative embodiment, each of the sensors 346, 348 is embodied as, or otherwise includes, any device or collection of devices capable of providing an input signal indicative of a distance between the sensor 346, 348 and the edge 344 of the disk 342. For the purposes of the present disclosure, the distance between the sensors 346, 348 and the edge 344 may refer to a distance between the sensors 346, 348 and any particular point of reference or reference frame located on the edge 344.

Each of the illustrative sensors 346, 348 may be embodied as, or otherwise include, a non-contacting displacement sensor, at least in some embodiments. In one example, each of the illustrative sensors 346, 348 may be embodied as, or otherwise include, an inductive proximity sensor or an eddy current sensor. In other embodiments, however, each of the illustrative sensors 346, 348 may be embodied as, or otherwise include, another suitable device. In any case, at least in some embodiments, the input signal provided by each of the sensors 346, 348 is embodied as, or otherwise includes, a sinusoidal input signal. Furthermore, in embodiments in which the sensors 346, 348 are orthogonally arranged and/or oriented as discussed above, among other embodiments, the sinusoidal input signals provided by the sensors 346, 348 may be phase shifted 90 degrees from one another.

In the illustrative embodiment, the encoder systems 240, 260 each include two sensors (e.g., the sensors 346, 348). However, in other embodiments, it should be appreciated that the encoder systems 240, 260 may each include another suitable number of sensors, such as more than two sensors, for example. In such embodiments, additional sensors may be employed to provide redundant measurement of the rotational position of each encoder system. Redundant measurement of the rotational position of each encoder system may be associated with, or facilitate achievement of, improved measurement of the torque applied to the driven component 230, at least in some embodiments. Furthermore, in some embodiments, signals provided by additional sensors may be processed using a least squares regression analysis to reduce noise effects, as the case may be.

Figure 4:
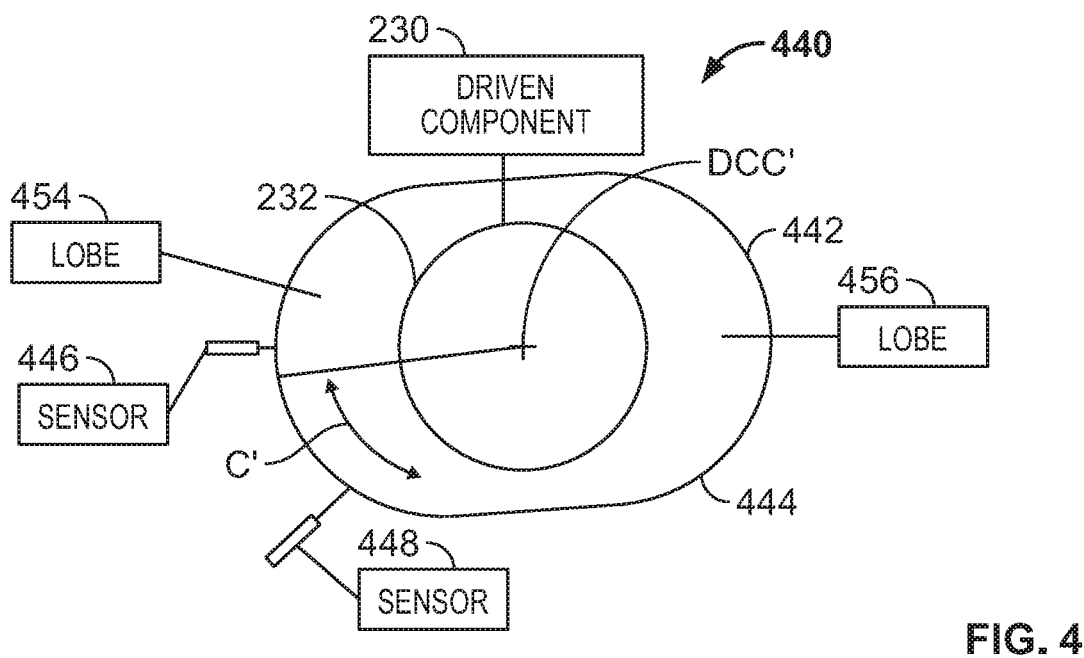
FIG. 4 is an end view of another embodiment of one of the encoder systems of the drive assembly diagrammatically depicted in FIG. 2.

Referring now to FIG. 4, an illustrative encoder system 440 is adapted for inclusion in the drive assembly 200 and the work machine 100. It should be appreciated that the encoder system 440 may be employed in lieu of, or in conjunction with, the encoder system 240. In the illustrative embodiment, the encoder system 440 and a substantially identical encoder system (not shown) are coupled to the respective ends 232, 234 of the driven component 230 in use thereof. For the sake of simplicity, detailed discussion of that identical encoder system is omitted. The encoder system 440 and the identical system are coupled to the driven component 230 in substantially identical fashion to the encoder systems 240, 260 discussed above.

The illustrative encoder system 440 includes a lobed disk 442 that is mounted to the driven component 230 for rotation therewith. Additionally, the encoder system 440 includes sensors 446, 448 that are mounted in close proximity to an outer edge 444 of the disk 442. The illustrative disk 442 includes lobes 454, 456. For ease of illustration, the depiction of the lobes 454, 456 in FIG. 4, as well as the depiction of any other lobes contemplated by the present disclosure in any other figures, may be exaggerated with respect to size.

In some embodiments, the lobed disk 442 may be mounted to the driven component 230 such that a portion of the lobed disk 442 is offset from, and spaced from, a center DCC' of the driven component 230. Additionally, in some embodiments, the lobed disk 442 may be mounted to the driven component 230 such that the portion of the lobed disk 442 is generally aligned with the driven component 230. Of course, in other embodiments, it should be appreciated that the lobed disk 442 and the driven component 230 may have another suitable positioning relative to one another dictated by the particular mounting arrangement.

In the illustrative embodiment, the sensors 446, 448 are mounted in close proximity to the edge 444 of the disk 442 such that the sensors 446, 448 are spaced from one another in a circumferential direction indicated by arrow C'. More specifically, the sensors 446, 448 are mounted in close proximity to the edge 444 such that the sensors 446, 448 are circumferentially, spaced 45 degrees from one another in the circumferential direction C'. However, in other embodiments, the sensors 446, 448 may have another suitable arrangement and/or orientation relative to one another.

In the illustrative embodiment, each of the sensors 446, 448 is embodied as, or otherwise includes, any device or collection of devices capable of providing an input signal indicative of a distance between the sensor 446, 448 and the edge 444 of the disk 442. For the purposes of the present disclosure, the distance between the sensors 446, 448 and the edge 444 may refer to a distance between the sensors 446, 448 and any particular point of reference or reference frame located on the edge 444.

Each of the illustrative sensors 446, 448 may be embodied as, or otherwise include, a non-contacting displacement sensor, at least in some embodiments. In one example, each of the illustrative sensors 446, 448 may be embodied as, or otherwise include, an inductive proximity sensor or an eddy current sensor. In other embodiments, however, each of the illustrative sensors 446, 448 may be embodied as, or otherwise include, another suitable device. In any case, at least in some embodiments, the input signal provided by each of the sensors 446, 448 is embodied as, or otherwise includes, a sinusoidal input signal. Furthermore, in embodiments in which the sensors 446, 448 are circumferentially spaced 45 degrees from one another as discussed above, the sinusoidal input signals provided by the sensors 446, 448 may be phase shifted 90 degrees from one another.

In the illustrative embodiment, the encoder system 440 and the encoder system substantially identical thereto each include two sensors (e.g., the sensors 446, 448). However, in other embodiments, it should be appreciated that each encoder system may include another suitable number of sensors, such as more than two sensors, for example. In such embodiments, additional sensors may be employed to provide redundant measurement of the rotational position of each encoder system. Redundant measurement of the rotational position of each encoder system may be associated with, or facilitate achievement of, improved measurement of the torque applied to the driven component 230, at least in some embodiments. Furthermore, in some embodiments, the signals provided by the additional sensors may be processed using a least squares regression analysis to reduce noise effects, as the case may be.

Figure 5:
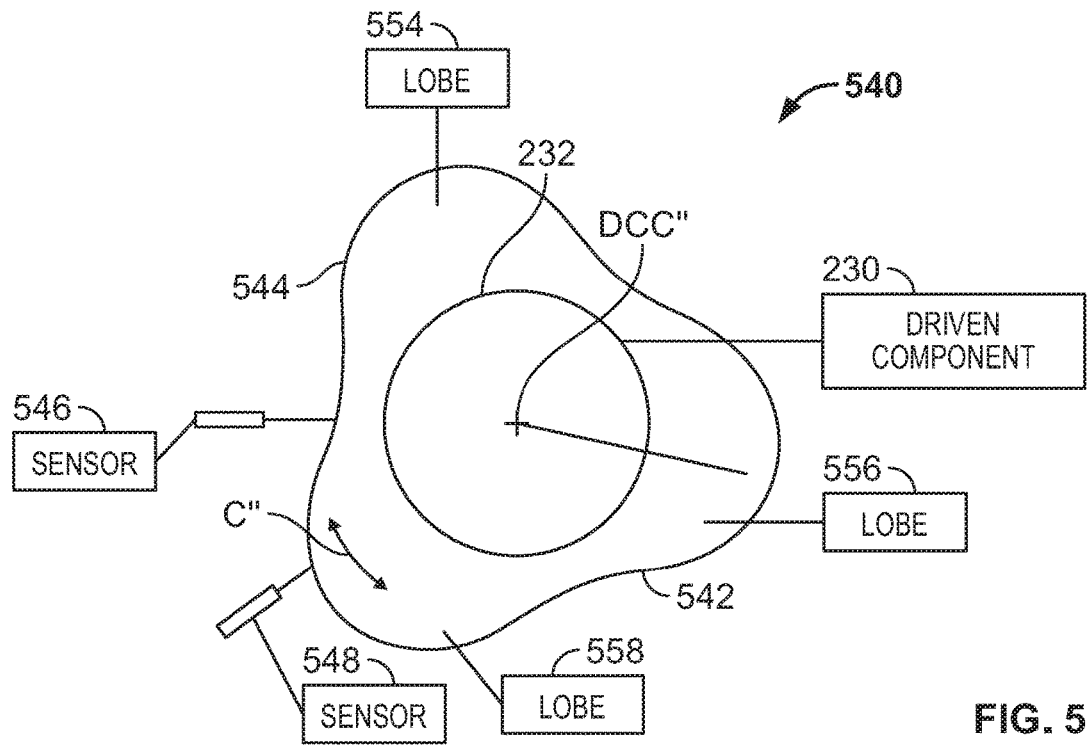
FIG. 5 is an end view of yet another embodiment of one of the encoder systems of the drive assembly diagrammatically depicted in FIG. 2.

Referring now to FIG. 5, an illustrative encoder system 540 is adapted for inclusion in the drive assembly 200 and the work machine 100. It should be appreciated that the encoder system 540 may be employed in lieu of, or in conjunction with, the encoder system 240 or the encoder system 440. In the illustrative embodiment, the encoder system 540 and a substantially identical encoder system (not shown) are coupled to the respective ends 232, 234 of the driven component 230 in use thereof. For the sake of simplicity, detailed discussion of that identical encoder system is omitted. The encoder system 540 and the identical encoder system are coupled to the driven component 230 in substantially identical fashion to the encoder systems 240, 260 discussed above.

The illustrative encoder system 540 includes a lobed disk 542 that is mounted to the driven component 230 for rotation therewith. Additionally, the encoder system 540 includes sensors 546, 548 that are mounted in close proximity to the edge 544 of the disk 542. The illustrative disk 542 includes three lobes 554, 556, 558.

In some embodiments, the lobed disk 542 may be mounted to the driven component 230 such that a portion of the lobed disk 542 is offset from, and spaced from; a center DCC" of the driven component 230. Additionally, in some embodiments, the lobed disk 542 may be mounted to the driven component 230 such that the portion is generally aligned with the driven component 230. Of course, in other embodiments, it should be appreciated that the disk 542 and the driven component 230 may have another suitable positioning relative to one another dictated by the particular mounting arrangement.

In the illustrative embodiment, the sensors 546, 548 are mounted in close proximity to the outer edge 544 of the disk 542 such that the sensors 546, 548 are spaced from one another in a circumferential direction indicated by arrow C". More specifically, the sensors 546, 548 are mounted in close proximity to the outer edge 544 such that the sensors 546, 548 are circumferentially spaced 45 degrees from one another. However, in other embodiments, the sensors 546, 548 may have another suitable arrangement and/or orientation relative to one another.

In the illustrative embodiment, each of the sensors 546, 548 is embodied as, or otherwise includes, any device or collection of devices capable of providing an input signal indicative of a distance between the sensor 546, 548 and the outer edge 544 of the disk 542. For the purposes of the present disclosure, the distance between the sensors 546, 548 and the edge 544 may refer to a distance between the sensors 546, 548 and any particular point of reference or reference frame located on the edge 544.

Each of the illustrative sensors 546, 548 may be embodied as, or otherwise include, a non-contacting displacement sensor, at least in some embodiments. In one example, each of the illustrative sensors 546, 548 may be embodied as, or otherwise include, an inductive proximity sensor or an eddy current sensor. In other embodiments, however, each of the illustrative sensors 546, 548 may be embodied as, or otherwise include, another suitable device. In any case, at least in some embodiments, the input signal provided by each of the sensors 546, 548 is embodied as, or otherwise includes, a sinusoidal input signal.

For the purposes of the present disclosure, circumferential spacing (i.e., in degrees) between any sensors contemplated herein may be mathematically represented by, and/or optimized according to, the relationship 90/N, where N refers to the number of lobes included in a given disk. Using the three-lobed disk 542 as an example, the sensors 546, 548 may be circumferentially spaced 30 degrees from one another about the disk 542, at least in some embodiments. Furthermore, in embodiments in which the sensors 546, 548 are circumferentially spaced 30 degrees from one another, the sinusoidal input signals provided by the sensors 546, 548 may be phase shifted 90 degrees from one another. It should be appreciated that circumferential spacing of the sensors determined and/or optimized according to the relationship mentioned above may provide a degree of measurement accuracy not achieved by other configurations.

In the illustrative embodiment, the encoder system 540 and the encoder system substantially identical thereto each include two sensors (e.g., the sensors 546, 548). However, in other embodiments, it should be appreciated that each encoder system may include another suitable number of sensors, such as more than two sensors, for example. In such embodiments, additional sensors may be employed to provide redundant measurement of the rotational position of each encoder system. Redundant measurement of the rotational position of each encoder system may be associated with, or facilitate achievement of, improved measurement of the torque applied to the driven component 230, at least in some embodiments. Furthermore, in some embodiments, the signals provided by the additional sensors may be processed using a least squares regression analysis to reduce noise effects, as the case may be.

Figure 6:
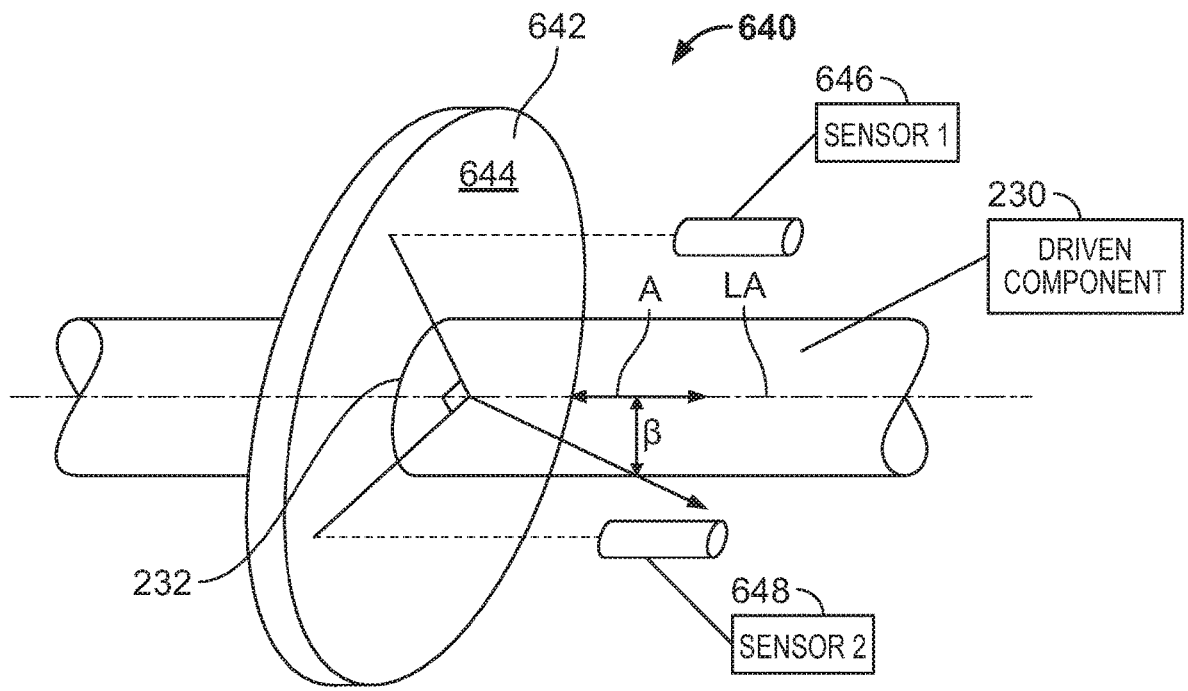
FIG. 6 is a partial side elevation view of yet another embodiment still of one of the encoder systems of the drive assembly diagrammatically depicted in FIG.

Referring now to FIG. 6, an illustrative encoder system 640 is adapted for inclusion in the drive assembly 200 and the work machine 100. It should be appreciated that the encoder system 640 may be employed in lieu of, or in conjunction with, the encoder system 240, the encoder system 440, or the encoder system 540. In the illustrative embodiment, the encoder system 640 and a substantially identical encoder system (not shown) are coupled to the respective ends 232, 234 of the driven component 230 in use thereof. For the sake of simplicity, detailed discussion of that identical encoder system is omitted. The encoder system 640 and the identical encoder system are coupled to the driven component 230 in substantially identical fashion to the encoder systems 240, 260 discussed above.

The illustrative encoder system 640 includes a disk 642 that is mounted to the driven component 230 for rotation therewith. The disk 642 may be embodied as, or otherwise include, a wobble disk or wobble plate, at least in some embodiments. In such embodiments, the disk 642 may be mounted to the driven component 230 at an angle β (measured between the centerline of the driven component 230 and a vector perpendicular to the disk 642) to facilitate tilt or wobble of the disk 642 in use of the encoder system 640.

In the illustrative embodiment, the encoder system 640 includes sensors 646, 648 that are mounted in close proximity to an outer face 644 of the disk 642. The sensors 646, 648 may be mounted to a stationary structure (e.g., a frame) in close proximity to the face 644. Each sensor 646, 648 is illustratively configured to detect an axial distance (i.e., as indicated by arrow A) along a longitudinal axis LA between the sensor 646, 648 and the face 644. Furthermore, in the illustrative embodiment, the sensors 646, 648 are circumferentially spaced 90 degrees from one another about the disk 642. Of course, in other embodiments, it should be appreciated that the sensors 646, 648 may have another suitable arrangement and/or orientation relative to one another about the outer face 644.

In some embodiments, the wobble disk 642 may include a plurality of waves or lobes (not shown). In such embodiments, circumferential spacing between the sensors 646, 648 relative to the disk 642 may be optimized according to the relationship 90/N described above, wherein N refers to the number of waves or lobes. Therefore, the sensors 646, 648 may be circumferentially spaced 45 degrees from one another relative to a disk having two lobes or waves, or 30 degrees from one another relative to a disk having three lobes or waves, as the case may be.

In the illustrative embodiment, each of the sensors 646, 648 is embodied as, or otherwise includes, any device or collection of devices capable of providing an input signal indicative of an axial distance between the sensor 646, 648 and the outer face 644 of the disk 642. For the purposes of the present disclosure, the distance between the sensors 646, 648 and the outer face 644 may refer to an axial distance between the sensors 646, 648 and any particular point of reference or reference frame located on the face 644.

Each of the illustrative sensors 646, 648 may be embodied as, or otherwise include, a non-contacting displacement sensor, at least in some embodiments. In one example, each of the illustrative sensors 646, 648 may be embodied as, or otherwise include, an inductive proximity, sensor or an eddy current sensor. In other embodiments, however, each of the illustrative sensors 646, 648 may be embodied as, or otherwise include, another suitable device. In any case, at least in some embodiments, the input signal provided by each of the sensors 646, 648 is embodied as, or otherwise includes, a sinusoidal input signal.

In the illustrative embodiment, the encoder system 640 and the encoder system substantially identical thereto each include two sensors (e.g., the sensors 646, 648). However, in other embodiments, it should be appreciated that each encoder system may include another suitable number of sensors, such as more than two sensors, for example. In such embodiments, additional sensors may be employed to provide redundant measurement of the rotational position of each encoder system. Redundant measurement of the rotational position of each encoder system may be associated with, or facilitate achievement of, improved measurement of the torque applied to the driven component 230, at least in some embodiments. Furthermore, in some embodiments, the signals provided by the additional sensors may be processed using a least squares regression analysis to reduce noise effects, as the case may be.

Figure 7:
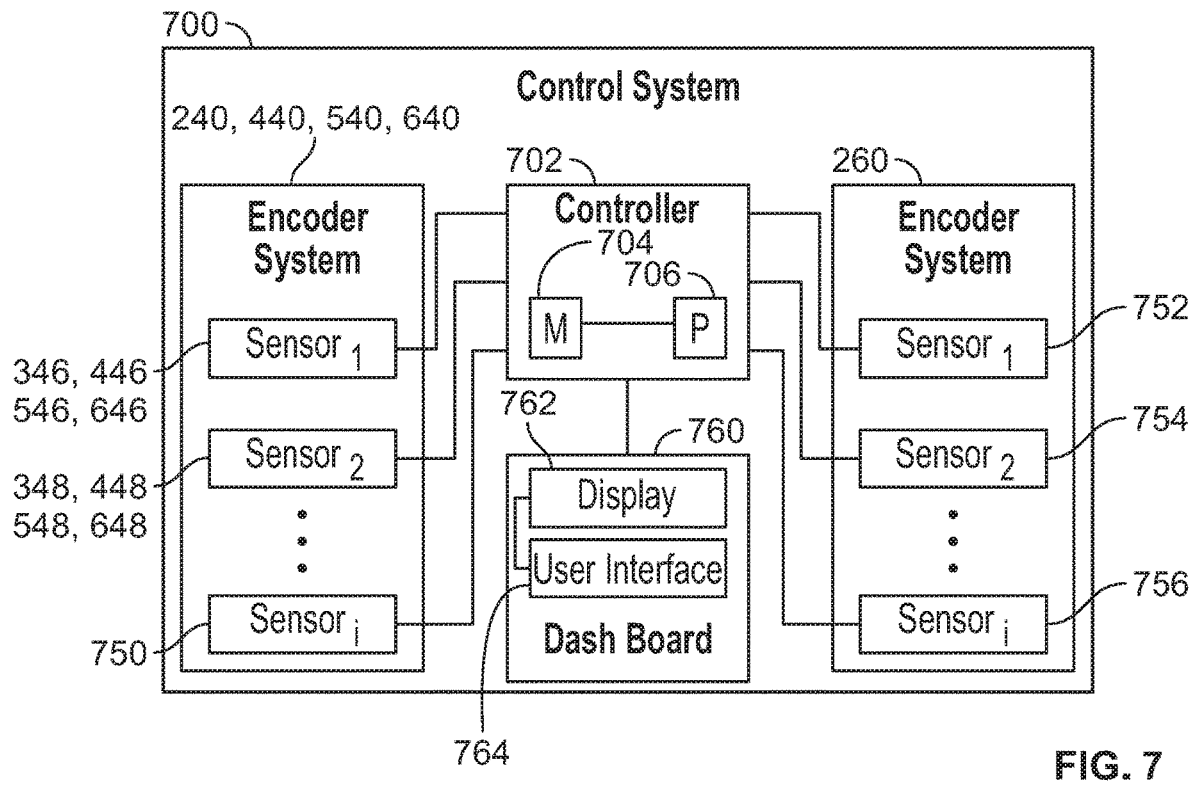
FIG. 7 is a diagrammatic view of a control system included in the work machine of FIG. 1.

Referring now to FIG. 7, the illustrative control system 700 includes the controller 702, a pair of encoder systems communicatively coupled to the controller 702, and a dashboard 760 communicatively coupled to the controller 702. One encoder system may be embodied as, or otherwise include, any one or more of the encoders systems 240, 440, 540, 640. The other encoder system may be embodied as, or otherwise include, any one or more of the encoder system 260 or the encoder systems that are substantially identical to the respective systems 440, 540, 640.

Each illustrative encoder system includes at least two sensors. The encoder system selected from the encoder systems 240, 440, 540, 640 includes a first sensor that may be selected from the sensors 346, 446, 546, 646. That encoder system also includes a second sensor that may be selected from the sensors 348, 448, 548, 648, Additionally, in some embodiments, the encoder system selected from the encoder systems 240, 440, 540, 640 may include one or more additional sensors 750. In any case, each of the sensors included in the encoder system selected from the encoder systems 240, 440, 540, 640 is communicatively coupled to the controller 702.

The encoder system selected from the encoder system 260 or the encoder systems that are substantially identical to the respective systems 440, 540, 640 includes a first sensor 752 and a second sensor 754. Additionally, in some embodiments, that encoder system may include one or more additional sensors 756. Regardless, each of the sensors included in the encoder system selected from the encoder system 260 or the encoder systems that are substantially identical to the respective systems 440, 540, 640 is communicatively coupled to the controller 702.

The memory device 704 of the illustrative controller 702 may be embodied as any type of volatile (e.g., dynamic random access memory (DRAM), etc.) or non-volatile memory, capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 704 may be embodied as a block addressable memory, such as those based on NAND or NOR technologies. The memory device 704 may also include future generation nonvolatile devices, such as a three dimensional crosspoint memory device (e.g., Intel 3D XPoint™ memory), or other byte addressable write-in-place nonvolatile memory devices. In some embodiments, the memory device 704 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The processor 706 of the illustrative controller 702 may be embodied as, or otherwise include, any type of processor, controller, or other compute circuit capable of performing various tasks such as compute functions and/or controlling the functions of the work machine 100. For example, the processor 706 may be embodied as a single or multi-core processor(s), a microcontroller, or other processor or processing/controlling circuit. In some embodiments, the processor 706 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 706 may be embodied as, or otherwise include, a high-power processor, an accelerator co-processor, or a storage controller. In some embodiments still, the processor 706 may include more than one processor, controller, or compute circuit.

The illustrative dashboard 760 includes a display 762 and a user interface 764 communicatively coupled thereto. The display 762 is configured to output or display various indications, messages, and/or prompts to an operator, which may be generated by the control system 700. The user interface 764 is configured to provide various inputs to the control system 700 based on various actions, which may include actions performed by an operator.

Figure 8:
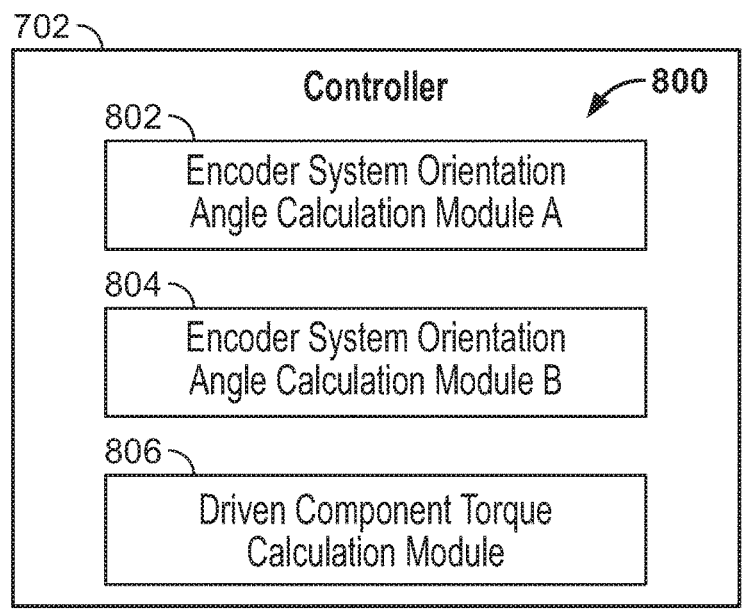
FIG. 8 is a diagrammatic view of a number of modules that may be included in a controller of the control system shown in FIG. 7.

Referring now to FIG. 8, in the illustrative embodiment, the controller 702 establishes an environment 800 during operation. The illustrative environment 800 includes an encoder system orientation angle calculation module 802, an encoder system orientation angle calculation module 804, and a driven component torque calculation module 806. Each of the modules, logic, and other components of the environment 800 may be embodied as hardware, firmware, software, or a combination thereof. As such, in some embodiments, one or more modules of the environment 800 may be embodied as circuitry or a collection of electrical devices. In such embodiments, one or more of the cleaning system activation modules 802, 804, 806 may form a portion of the processor(s) 706 and/or other components of the controller 702. Additionally, in some embodiments, one or more of the illustrative modules may form a portion of another module and/or one or more of the illustrative modules may be independent of one another. Further, in some embodiments, one or more of the modules of the environment 800 may be embodied as virtualized hardware components or emulated architecture, which may be established and maintained by the processor(s) 706 or other components of the controller 702.

The encoder system orientation angle calculation module 802, which may be embodied as hardware, firmware, software, virtualized hardware, emulated architecture, and/or a combination thereof as discussed above, is configured to calculate an orientation angle of the encoder system (e.g., the disk of the encoder system) coupled to the end 232 of the driven component 230 based on the input signals provided by the two sensors included in the encoder system, as further described below. To do so, in the illustrative embodiment, the encoder system orientation angle calculation module 802 may perform one or more blocks of the method 900 described below with reference to FIGS. 9 and 10.

The encoder system orientation angle calculation module 804, which may be embodied as hardware, firmware, software, virtualized hardware, emulated architecture, and/or a combination thereof as discussed above, is configured to calculate an orientation angle of the encoder system (e.g., the disk of the encoder system) coupled to the end 234 of the driven component 230 based on the input signals provided by the two sensors included in the encoder system, as further described below. To do so, in the illustrative embodiment, the encoder system orientation angle calculation module 804 may perform one or more blocks of the method 900 described below with reference to FIGS. 9 and 10.

The driven component torque calculation module 806, which may be embodied as hardware, firmware, software, virtualized hardware, emulated architecture, and/or a combination thereof as discussed above, is configured to calculate a torque of the driven component 230 based on the calculated orientation angles of the encoder systems coupled to the respective ends 232, 234 of the driven component 230. To do so, in the illustrative embodiment, the driven component torque calculation module 806 may perform one or more blocks of the method 900 described below with reference to FIGS. 9 and 10.

Figure 9:
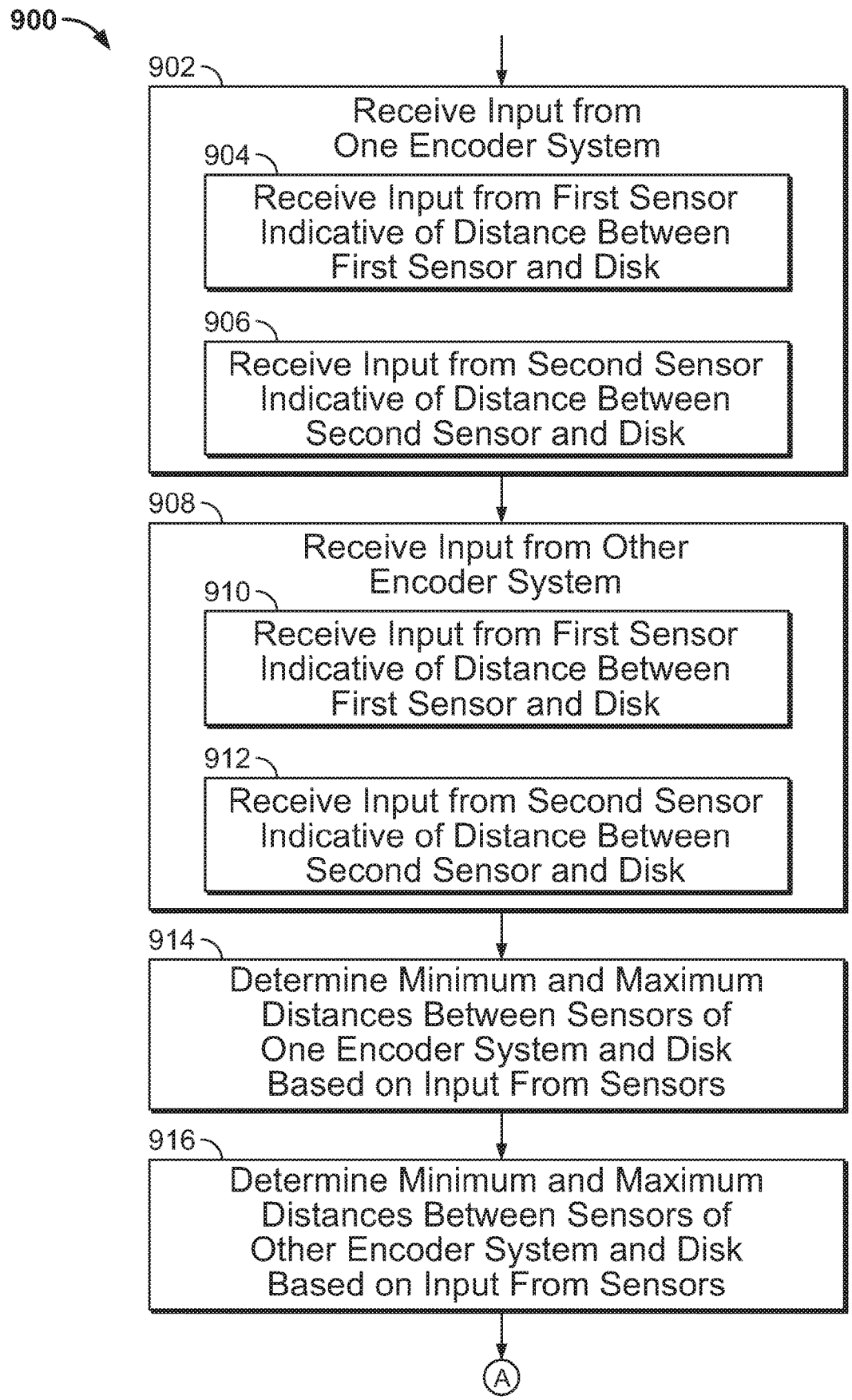
FIG. 9 is a simplified flowchart of a portion of a method that may be performed by the controller diagrammatically depicted in FIG. 7.
Figure 10:
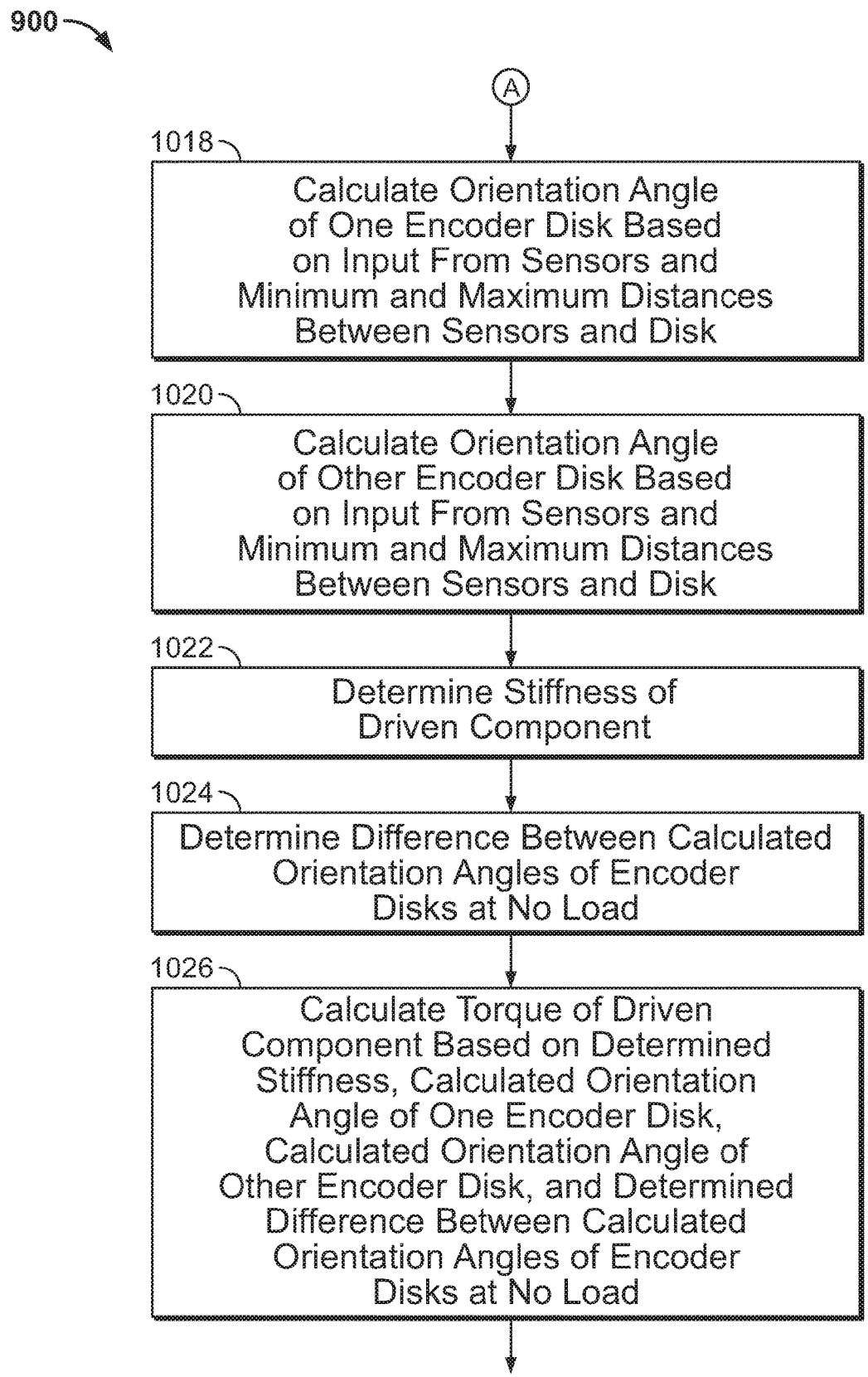
FIG. 10 is a simplified flowchart of another portion of the method of FIG. 9.

Referring now to FIGS. 9 and 10, an illustrative method 900 of measuring torque of the driven component 230 in use of work machine 100 may be embodied as, or otherwise include, a set of instructions that are executable by the control system 700 (i.e., the modules 802, 804, 806 of the controller 702). The method 900 corresponds to, or is otherwise associated with, performance of the blocks described below in the illustrative sequence of FIGS. 9 and 10. It should be appreciated, however, that the method 900 may be performed in one or more sequences different from the illustrative sequence. Additionally, it should be appreciated that one or more blocks of the illustrative method 900 may be performed in parallel with, or contemporaneously with, one another.

The illustrative method 900 begins with block 902. In block 902, the controller 702 receives input from one encoder system mounted to the driven component 230 (i.e., any encoder system described herein that is coupled to one of the ends 232, 234 of the component 230). To perform block 902, the controller 702 perform blocks 904 and 906. In block 904, the controller 702 receives the input signal from one sensor indicative of the distance between the sensor and any reference point (e.g., one of the outer edges 344, 444, 544 or the face 644) of the disk (e.g., any one of the disks 342, 442, 542, 642) of the one encoder system. Additionally, in block 906, the controller 702 receives the input signal from another sensor spaced from the one sensor. Subsequent to block 902, the method 900 proceeds to block 908.

In block 908 of the illustrative method 900, the controller 702 receives input from the other encoder system mounted to the driven component 230 (i.e., any encoder system described herein that is coupled to the other of the ends 232, 234 of the component 230). To perform block 908, the controller 702 perform blocks 910 and 912. In block 910, the controller 702 receives the input signal from one sensor indicative of the distance between the sensor and any reference point (e.g., one of the outer edges 344, 444, 544 or the face 644) of the disk (e.g., any one of the disks 342, 442, 542, 642) of the other encoder system. Additionally, in block 912, the controller 702 receives the input signal from another sensor spaced from the one sensor. Subsequent to block 908, the method 900 proceeds to block 914.

In each of blocks 902 and 908, at least in some embodiments, the input signal provided by one sensor of each encoder system may be received by the controller 702 and represented and/or resolved according to the following equation:

$$y_1 = h*(1-\cos(\Theta)) + y_{min1} \quad (1)$$

in equation (1), $y_1$ is indicative of a measured distance between the one sensor and the reference point on the particular disk, $\Theta$ is indicative of an angular orientation of the particular disk on which the one sensor is mounted, $y_{min1}$ is indicative of a measured minimum distance between the one sensor and the reference point during rotation of the disk, and h is mathematically represented and/or resolved by the following equation:

$$h = 0.5*(y_{max1} - y_{min1}) \quad (2)$$

In equation (2), $y_{max1}$ is indicative of a maximum measured distance between the one sensor and the reference point during rotation of the disk. It should be appreciated that the aforementioned variables may be measured, represented, and/or resolved over a reference time interval or sample interval. Furthermore, it should be appreciated that the reference time or sample interval may correspond to, or otherwise be associated with, a reference angular displacement value (e.g., number of revolutions, etc.).

Additionally, in each of blocks 902 and 908, at least in some embodiments, the input signal provided by the other sensor of each encoder system may be received by the controller 702 and represented and/or resolved according to the following equation:

$$y_2 = h*(1-\sin(\Theta)) + y_{min2} \quad (3)$$

in equation (3), $y_2$ is indicative of a measured distance between the other sensor and the reference point on the particular disk, $\Theta$ is indicative of the angular orientation of the particular disk as discussed above, $y_{min2}$ is indicative of a measured minimum distance between the other sensor and the reference point as discussed above, and h is represented and/or resolved based on equation (2) with (i) $y_{max2}$ (i.e., a maximum measured distance between the other sensor and the reference point) used in lieu of $y_{max1}$ and (ii) $y_{min2}$ used in lieu of $y_{min1}$. In some embodiments, performance of blocks 902 and 908 may produce, or otherwise be associated with, a first value of h for the one sensor of each encoder system and a second value of h for the other sensor of each encoder system. Additionally, in some embodiments, the first and second values of h may be substantially the same. In some embodiments yet still, any difference between the first and second values of h may correspond to, or otherwise associated with, a degree of measurement error.

Returning to the illustrative method 900, in block 914 thereof, and based on the input signals (i.e., $y_1$ and $y_2$) received from the one encoder system in block 902, the controller 702 determines the minimum and maximum measured distances (i.e., $y_{min1}/y_{min2}$ and $y_{max1}/y_{max2}$, respectively) between each sensor of the one encoder system and the particular reference point on the particular disk in close proximity to which the sensors are mounted. As suggested above, the controller 702 may perform block 914 over a reference time interval, sample interval, and/or reference angular displacement value, at least in some embodiments. In any case, from block 914, the method 900 subsequently proceeds to block 916.

In block 916 of the illustrative method 900, based on the input signals (i.e., $y_1$ and $y_2$) received from the other encoder system in block 908, the controller 702 determines the minimum and maximum measured distances (i.e., $y_{min1}/y_{min2}$ and $y_{max1}/y_{max2}$, respectively) between each sensor of the other encoder system and the particular reference point on the particular disk in close proximity to which the sensors are mounted. The controller 702 may perform block 916 over a reference time interval, sample interval, and/or reference angular displacement value, at least in some embodiments. From block 916, the method 900 subsequently proceeds to block 1018.

In block 1018 of the illustrative method 900, based on the input signals received from the one encoder system in block 902 and the minimum and maximum distances determined in block 914, the controller 702 calculates an orientation angle of the particular disk of the one encoder system. At least in some embodiments, the orientation angle calculated in block 1018 may be mathematically represented and/or resolved according to the following equation:

$$\Theta = \text{ATAN } 2(1-(y_2-y_{min2})/h, 1-(y_1-y_{min1})/h) \quad (4)$$

In equation (4), $\Theta$ is indicative of the orientation angle of the particular disk as discussed above, $y_2$ is indicative of a measured distance between the other sensor and the reference point on the particular disk as discussed above, $y_1$ is indicative of a measured distance between the one sensor and the reference point on the particular disk as discussed above, and h is represented and/or resolved as discussed above. Additionally, $y_{min2}$ and $y_{min1}$ correspond to the values discussed above. From block 1018, the method 900 subsequently proceeds to block 1020.

In block 1020 of the illustrative method 900, based on the input signals received from the other encoder system in block 908 and the minimum and maximum distances determined in block 916, the controller 702 calculates an orientation angle of the particular disk of the other encoder system. The orientation angle is calculated by the controller 702 in block 1020 based on the relationship described above with reference to block 1018. From block 1020, the method 900 subsequently proceeds to block 1022.

In block 1022 of the illustrative method 900, the controller 702 determines a stiffness value of the driven component 230. It should be appreciated that the stiffness value determined by the controller 702 in block 1022 may be a reference stiffness value stored in the memory 704 and retrieved by the processor 706 of the controller 702, at least in some embodiments. Additionally, it should be appreciated that in some embodiments, the stiffness value determined by the controller 702 in block 1022 may be calculated and/or resolved based on one or more inputs provided to the controller 702. In any case, subsequent to block 1022, the method 900 proceeds to block 1024.

In block 1024 of the illustrative method 900, the controller 702 determines a difference between the calculated orientation angles of the two encoder systems (i.e., the calculations performed in blocks 1018 and 1020) at zero or no load. From block 1024, the method 900 subsequently proceeds to block 1026.

In block 1026 of the illustrative method 900, based on the stiffness determined in block 1024, the orientation angle calculated in block 1018, the orientation angle calculated in block 1020, and the difference determined in block 1024, the controller 702 calculates a torque of the driven component 230. At least in some embodiments, the torque calculated in block 1026 may be mathematically represented and/or resolved according to the following equation:

$$T = K^*(\Theta_2 - \Theta_1 - \text{delta}\_\Theta_0) \quad (5)$$

In equation (5), T is indicative of the torque of the driven component 230, K is indicative of the stiffness of the driven component 230, $\Theta_2$ is indicative of the orientation angle calculated in block 1020, $\Theta_1$ is indicative of the orientation angle calculated in block 1018, and delta$\_\Theta_0$ is indicative of the relative angle between the disks of the encoder systems at zero load. In the illustrative embodiment, delta$\_\Theta_0$ is determined by performing a calibration measurement at a known reference load. More specifically, in some embodiments, delta$\_\Theta_0$ is mathematically represented and/or resolved according to the following equation:

$$\text{delta}\_\Theta_0 = -T_{ref}/K + \Theta_{2ref} - \Theta_{1ref} \quad (6)$$

In equation (6), $T_{ref}$ is indicative of the torque of the driven component 230 at the known reference load, $\Theta_{2ref}$ is indicative of the orientation angle of the particular disk of the encoder system at the known reference load, and $\Theta_{1ref}$ is indicative of the orientation of the particular disk of the encoder system at the known reference load. In some embodiments, completion of block 1026 corresponds to, or is otherwise associated with, a single iterative performance of the method 900 by the controller 702.

In some embodiments, positioning (e.g., radial and/or circumferential positioning) between two or more sensors of any encoder system contemplated by the present disclosure may be measured based on the input signals (e.g., $y_1$ and $y_2$) received from the sensors of the particular encoder system. In some cases, such positioning may be based on, or otherwise directed toward, a target value (e.g., 90 degrees±10 degrees). Additionally, in some cases, the target value may be compared to a cross spectrum calculation of the angle between two or more sensors of a particular encoder system based on the input signals. In those cases, the calculated angle may be used in the calculation of $\Theta$ described above with reference to equation (4).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A work machine comprising:
   a frame structure;
   a rotational power source supported by the frame structure;
   a shaft supported by the frame structure that is coupled to the rotational power source to receive rotational power therefrom in use of the work machine, wherein the shaft extends between a first end and a second end arranged opposite the first end;

a first encoder system coupled to the first end of the shaft, wherein the first encoder system includes a first disk mounted to the shaft for rotation therewith and a first pair of sensors mounted in close proximity to the first disk that are spaced from one another, and wherein each one of the first pair of sensors is configured to provide a first input signal indicative of a distance between the one of the first pair of sensors and an outer edge of the first disk or an outer face of the first disk in use of the work machine;

a second encoder system coupled to the second end of the shaft, wherein the second encoder system includes a second disk mounted to the shaft for rotation therewith and a second pair of sensors mounted in close proximity to the second disk that are spaced from one another, and wherein each one of the second pair of sensors is configured to provide a second input signal indicative of a distance between the one of the second pair of sensors and an outer edge of the second disk or an outer face of the second disk in use of the work machine; and a control system supported by the frame structure that includes a controller communicatively coupled to the first encoder system and the second encoder system, wherein the controller includes memory having instructions stored therein that are executable by a processor in use of the work machine to cause the processor to receive the first input signals from the first pair of sensors and the second input signals from the second pair of sensors and to calculate a torque of the shaft based at least partially on the first input signals and the second input signals.

2. The work machine of claim 1, wherein each of the first and second disks is an eccentric circular disk having a disk center that is offset from a center of the shaft.

3. The work machine of claim 2, wherein the first pair of sensors are mounted in close proximity to the first disk such that the first pair of sensors are circumferentially spaced 90 degrees from one another about the disk center of the first disk, and wherein the second pair of sensors are mounted in close proximity to the second disk such that the second pair of sensors are circumferentially spaced 90 degrees from one another about the disk center of the second disk.

4. The work machine of claim 1, wherein each of the first and second disks is a lobed disk having at least one lobe.

5. The work machine of claim 4, wherein each of the first and second disks is an elliptical disk having a pair of lobes.

6. The work machine of claim 4, wherein each of the first and second disks has three lobes.

7. The work machine of claim 4, wherein at least one of the first and second disks is offset from a center of the shaft.

8. The work machine of claim 1, wherein each one of the first pair of sensors is configured to provide the first input signal indicative of the distance between the one of the first pair of sensors and the outer edge of the first disk in use of the work machine, and wherein each one of the second pair of sensors is configured to provide the second input signal indicative of the distance between the one of the second pair of sensors and the outer edge of the second disk in use of the work machine.

9. The work machine of claim 1, wherein each one of the first pair of sensors is configured to provide the first input signal indicative of the distance between the one of the first pair of sensors and the outer face of the first disk in use of the work machine, and wherein each one of the second pair of sensors is configured to provide the second input signal indicative of the distance between the one of the second pair of sensors and the outer face of the second disk in use of the work machine.

10. The work machine of claim 1, wherein the instructions stored in the memory are executable by the processor to cause the processor to determine minimum and maximum distances between the first pair of sensors and the outer edge of the first disk based on the first input signals, to determine minimum and maximum distances between the second pair of sensors and the outer edge of the second disk based on the second input signals, to calculate an orientation angle of the first disk based on the first input signals and the determined minimum and maximum distances between the first pair of sensors and the outer edge of the first disk, and to calculate an orientation angle of the second disk based on the second input signals and the determined minimum and maximum distances between the second pair of sensors and the outer edge of the second disk.

11. The work machine of claim 10, wherein the instructions stored in the memory are executable by the processor to cause the processor to determine a stiffness of the shaft, to determine a difference between the calculated orientation angles of the first disk and the second disk at a reference load, and to calculate the torque of the shaft based on the determined stiffness, the calculated orientation angle of the first disk, the calculated orientation angle of the second disk, and the determined difference between the calculated orientation angles of the first disk and the second disk at the reference load.

12. A drive assembly for a work machine, the drive assembly comprising:

a shaft to receive rotational power from a rotational power source in use of the drive assembly, wherein the shaft extends between a first end and a second end arranged opposite the first end;

a first encoder system coupled to the first end of the shaft for rotation therewith, wherein the first encoder system includes a first disk mounted to the shaft and a first pair of sensors mounted in close proximity to the first disk that are spaced from one another, and wherein each one of the first pair of sensors is configured to provide a first input signal indicative of a distance between the one of the first pair of sensors and an outer edge of the first disk in use of the drive assembly;

a second encoder system coupled to the second end of the shaft for rotation therewith, wherein the second encoder system includes a second disk mounted to the shaft and a second pair of sensors mounted in close proximity to the second disk that are spaced from one another, and wherein each one of the second pair of sensors is configured to provide a second input signal indicative of a distance between the one of the second pair of sensors and an outer edge of the second disk in use of the drive assembly; and a control system that includes a controller communicatively coupled to the first encoder system and the second encoder system, wherein the controller includes memory having instructions stored therein that are executable by a processor in use of the work machine to cause the processor to receive the first input signals from the first pair of sensors and the second input signals from the second pair of sensors and to calculate a torque of the shaft based at least partially on the first input signals and the second input signals.

13. The drive assembly for a work machine of claim 12, wherein each of the first and second disks is an eccentric circular disk having a disk center that is offset from a center of the shaft.

14. The drive assembly for a work machine of claim 13, wherein the first pair of sensors are mounted in close proximity to the first disk such that the first pair of sensors are circumferentially spaced 90 degrees from one another about the disk center of the first disk, and wherein the second pair of sensors are mounted in close proximity to the second disk such that the second pair of sensors are circumferentially spaced 90 degrees from one another about the disk center of the second disk.

15. The drive assembly for a work machine of claim 12, wherein each of the first and second disks is a lobed disk having at least one lobe.

16. The drive assembly for a work machine of claim 15, wherein each of the first and second disks is an elliptical disk having a pair of lobes.

17. A method of measuring torque of a shaft of a work machine, the method comprising:
coupling a first encoder system of the work machine to a first end of the shaft, wherein coupling the first encoder system to the first end of the shaft comprises mounting a first disk of the first encoder system to the shaft and mounting a first pair of sensors of the first encoder system in close proximity to the first disk such that the first pair of sensors are spaced from one another;
coupling a second encoder system of the work machine to a second end of the shaft arranged opposite the first end, wherein coupling the second encoder system to the second end of the shaft comprises mounting a second disk of the second encoder system to the shaft and mounting a second pair of sensors of the second encoder system in close proximity to the second disk such that the second pair of sensors are spaced from one another;
communicatively coupling a controller of the work machine to the first encoder system and the second encoder system; and
measuring, by the controller, torque of the shaft, wherein measuring the torque of the shaft comprises executing, by a processor of the controller, instructions stored in a memory of the controller that cause the processor to:
receive a first input signal from each one of the first pair of sensors of the first encoder system that is indicative of a distance between the one of the first pair of sensors and an outer edge of the first disk of the first encoder system;
receive a second input signal from each one of the second pair of sensors of the second encoder system that is indicative of a distance between the one of the second pair of sensors and an outer edge of a second disk of the second encoder system; and
calculate the torque of the shaft based at least partially on the first input signals from the first pair of sensors and the second input signals from the second pair of sensors.

18. The method of claim 17, wherein executing the instructions stored in the memory of the controller further causes the processor to:
determine minimum and maximum distances between the first pair of sensors and the outer edge of the first disk based on the first input signals; and
determine minimum and maximum distances between the second pair of sensors and the outer edge of the second disk based on the second input signals.

19. The method of claim 18, wherein executing the instructions stored in the memory of the controller further causes the processor to:
calculate an orientation angle of the first disk based on the first input signals and the determined minimum and maximum distances between the first pair of sensors and the outer edge of the first disk; and
calculate an orientation angle of the second disk based on the second input signals and the determined minimum and maximum distances between the second pair of sensors and the outer edge of the second disk.

20. The method of claim 19, wherein executing the instructions stored in the memory of the controller further cause the processor to:
determine a stiffness of the shaft;
determine a difference between the calculated orientation angles of the first disk and the second disk at a reference load; and
calculate the torque of the shaft based on the determined stiffness, the calculated orientation angle of the first disk, the calculated orientation angle of the second disk, and the determined difference between the calculated orientation angles of the first disk and the second disk at the reference load.

* * * * *